(No Model.) 6 Sheets—Sheet 1.

A. F. STOWE.
MACHINE FOR SPLITTING LAPS ON LEATHER BELTING.

No. 248,525. Patented Oct. 18, 1881.

Fig. 1.

WITNESSES.
C. R. Barton
S. E. King

INVENTOR.
Aaron F. Stowe
By Chas. H. Burleigh
Atty.

Fig. 3

(No Model.) 6 Sheets—Sheet 5.

A. F. STOWE.
MACHINE FOR SPLITTING LAPS ON LEATHER BELTING.

No. 248,525. Patented Oct. 18, 1881.

WITNESSES.

INVENTOR.
Aaron F. Stowe
By Chas. H. Burleigh
Atty.

UNITED STATES PATENT OFFICE.

AARON F. STOWE, OF WORCESTER, MASSACHUSETTS.

MACHINE FOR SPLITTING LAPS ON LEATHER BELTING.

SPECIFICATION forming part of Letters Patent No. 248,525, dated October 18, 1881.

Application filed April 18, 1881. (No model.)

*To all whom it may concern:*

Be it known that I, AARON F. STOWE, of Worcester, in the county of Worcester and State of Massachusetts, have invented certain new and useful Improvements in Machines for Splitting Laps on Leather Belting, &c.; and I declare the following to be a description of my said invention sufficiently full, clear, and exact to enable others skilled in the art to which it appertains to make and use the same, reference being had to the accompanying drawings, which form a part of this specification.

The primary objects of my present invention are, first, the production of a practical machine for automatically splitting tapers in leather or for forming the laps on leather belting; second, to adapt mechanism for the splitting of laps or tapers of various lengths and on different thicknesses of material; third, to provide means for automatically squaring off the thin or feather edge of the lap when the same is formed; fourth, to afford facilities for the adjustment and alteration of the mechanism for different inclinations or forms of taper or bevel; fifth, to afford facilities for the retirement of the cutting mechanism to allow space for the adjustment of the stock or belting; sixth, to provide means for indicating the position of the stock for forming given lengths of laps or tapers; seventh, to provide suitable driving mechanism with starting devices and automatic stop devices for actuating and governing the operations of the machine by power or hand; eighth, to provide means for holding or retaining the leather on the cylinder or guiding-bed; ninth, to afford facilities for the adjustment and retention of the holding devices at different positions as desired; and, tenth, to afford means for directing and pressing the leather immediately at the cutting-line of the knife, so as to preserve the thin portion of the laps. I attain these objects by mechanism organized and arranged for operation substantially as illustrated and described, the particular features claimed being hereinafter definitely specified.

The first part of my invention relates to the manner of producing tapers or laps on leather by the conjoint action of a stationary splitting-knife, a revolving bed-cylinder or cylindrical guiding-surface, a yielding presser-bar, and mechanism for automatically advancing said cylinder or guiding-surface bodily toward said knife with a regular or defined movement during the time of cutting action, or while the leather is being split by its being carried forward against the edge of the knife by the revolution of said cylinder. These parts in my present machine are arranged as follows:

A denotes the main frame, of suitable size and form for supporting the operative parts of the mechanism.

B denotes the knife-bed, carrying the splitting-blade C, and supported in an inclined position upon the breast-girt A′ of the frame in such manner that it can be moved backward and forward to set the splitting-blade C down to working position or to run it up for opening the throat and allowing the convenient introduction of the stock or belting. Springs *b* are provided for returning the knife-bed B and blade C, and cams B′ are provided for forcing said bed and blade to working position, said cams being fixed on a shaft, B², journaled on the breast-girt A', and provided with a hand-wheel or suitable means for its convenient operation. The ends of the knife-bed B slide in grooves on the frame A, and are fitted with wedging inclines, (see Fig. 13,) which take solid bearings when the parts are set down by the cams, and thus support the knife-bed rigid and firm while the blade is stationary in working position.

C' denotes a re-enforce bar for bracing and stiffening the blade C.

D indicates the roll or bed-cylinder for supporting the leather or belting and carrying it against the blade C. Said cylinder is journaled in boxes $d$, fitted to work up and down in guiding-jaw in the frames A, and provided with spring devices $d'$ (see Fig. 6) for depressing or drawing them downward. The cylinder-journals extend beyond the bearing-boxes $d$, and are provided with traverse-wheels D' and gears D², the latter being rigidly keyed to the cylinder-shaft, so as to give motion to said cylinder.

A pinion, E, provided with a hand-wheel, E', is supported on a suitable stud at the end of the machine to mesh with one of the gears D² and serve as a means for turning the cylinder by hand.

The traverse-wheels D', which support the cylinder D, rest and roll upon inclines or traverse-bars F, fixed to supporting-slides F', arranged to run on guideways or rails G at the sides of the machine.

The gears D² mesh with racks F², rigidly secured to or formed on the traverse-bars F. The pitch-lines of the gears and racks respectively coincide with the contact-surfaces of the traverse-wheels D' and inclines F, so that the parts will move together or roll upon each other with a uniform action, the racks and gears causing the slides to move rearward as the top of the cylinder revolves toward the edge of the splitting-knife.

The forward ends of the inclines or traverse-bars F are supported at such height that when the points $e$ are beneath the center or axis of the wheels D' the top of the cylinder will be in contact (or as near as it can work practically) with the edge of the knife C. The rear ends of said bars F stand at a lower level, so that when they are at their forward position the cylinder will be dropped some distance below the edge of the knife C. The traversing of the wheels D' on these inclined surfaces or bars F as the cylinder revolves causes an upward movement of the entire bed or cylinder while splitting the leather, and by thus reducing the distance between the guiding-surface and blade C produces the taper, or splits the lap in the desired manner, as governed by the form or inclination of the traverse-bars F. The rails or guideways G are bolted through slots to the side of the frames, and are adapted for vertical adjustment by means of leveling-screws $f$, whereby the position of the working parts can be accurately adjusted to bring the guiding-surface of the cylinder D parallel with the cutting-edge of the knife C. The working position for the knife C is with its cutting-edge at, or nearly at, the center-line of the cylinder or over the axial center of the same, as indicated.

Another important part of my invention relates to the manner of producing tapers or laps of different lengths by mechanism for varying the adjustment of the traverse F, and for which purpose I employ, in the present instance, eccentric cams H, which are fixed on a connecting-shaft, H', mounted in bearing-boxes H², which are movably connected by suitable lips and guiding-grooves to the slide-shoes F', as indicated. The cams H are arranged beneath the traverse-bars, to which they are connected by a yoke, $h$, fitting around the eccentric H and joined to the bar F by lips and grooves in similar manner as the bearing-boxes H² are joined to the slide F', to permit the movement of the cams, yokes, and boxes longitudinally between the parts F and F', while connecting them to each other. The traverse-bars F are pivoted or fulcrumed to an upward-extended part of their slides F', as indicated at $e$. This position is the highest part on the bars F and represents the cut-off point of the mechanism. The fulcrum $e$ supports one end of the bar F, while the other is supported by the cam and boxes H H². The height of the latter support is lower than the support at the fulcrum $e$, (except when the eccentric is turned squarely up,) thus giving an inclination to the top surface of said bars F, on which the traverse-wheels D' roll, and the degree of this inclination can be varied by changing the position of the boxes H² and cams H nearer to or farther from the fulcrum-point $e$. The inclination of the traverse-bars F can also be varied by the action of the eccentrics H, the shaft H' being turned so as to swing them more or less up or down. (See dotted lines, Fig. 10.) The shaft H' is provided with a hand-lever, H⁴, or other means for the convenient operation of the eccentrics as desired, and with a lock or clamp-device, H³, for retaining the parts at adjusted position. This locking device in the present instance consists of a slotted disk, H³, attached to the shaft H', and a spring clamp-dog, $g$, supported on a bracket attached to the journal-box H², said dog being arranged to automatically engage and clamp the disk, so as to hold the shaft from turning out of place. The clamp can be released by pressing back the outer end of the dog-piece $g$. The frames A are made open at their center, to permit of the shaft traversing backward and forward with the movement of the slides F' and bars F.

Figure 4:
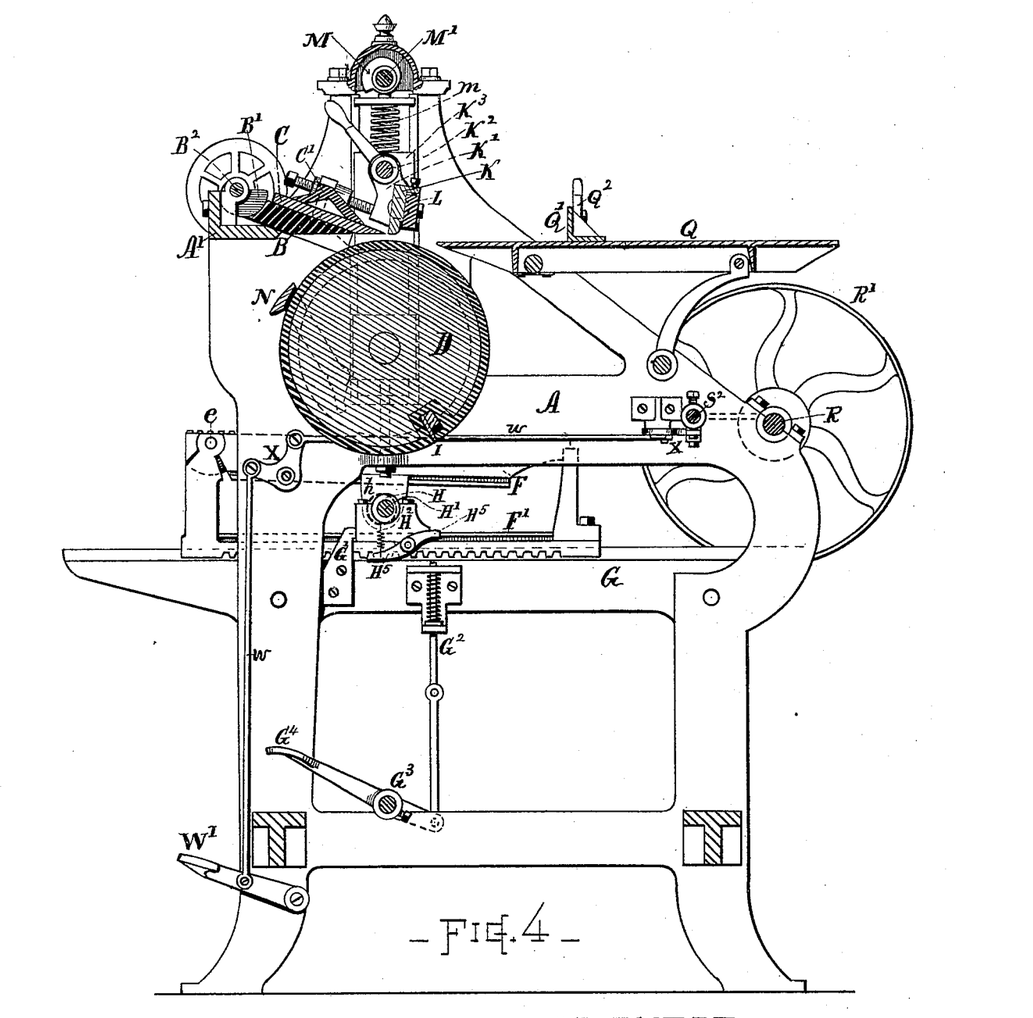
Fig. 4 is a vertical sectional view, from front to rear, at line *x x*, Fig. 2.
Figures 10, 11, 13:
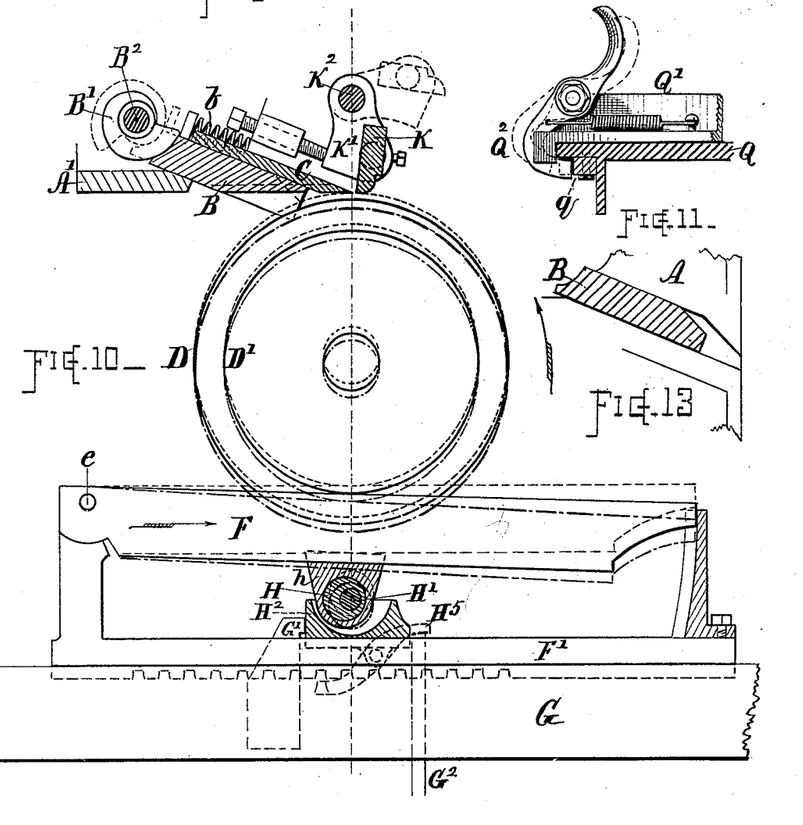
Fig. 10 is an outline sectional diagram of the cylinder, traverse-bars, cutting devices, and adjusting devices, with dotted lines illustrating the action of the mechanism.
Fig. 11 is a larger scale view of one of the table-gage latches.
Fig. 13 is a section through the end of the knife-bed, showing the wedging form and the contracted guiding groove for embracing the knife-bed when pressed forward.

The parts are so constructed and arranged that the shaft H' can move forward only to a position under the center of the cylinder D, at which position its journal-boxes H² strike against stops G', fixed to the rails G. This position is the starting-point of the mechanism, and at this position the adjustment of the parts to correspond with different lengths of lap can be effected. The journal-boxes H² are locked to the slides F' by means of latch-levers H⁵, arranged as shown in Figs. 4 and 10, which levers are fulcrumed on said boxes and lock into recesses on the lower edges of the slide-bars F', for retaining the parts at their several positions of adjustment.

Pins or bolts G², working through guides fixed to the rails G, are arranged to be moved upward past the ends of the boxes H' for locking said boxes in position against the stops G' while effecting the adjustment of the cylinder and traverse devices for different lengths of laps. The pins G² at the same time operate the latch-levers H⁵ to release said boxes H² on the slides F', so that said slides and the traverse-bars F can be run forward or back, by turning the hand-wheel E', thereby changing the position of the cut-off point $e$, in relation to the starting-point or center of shaft H', to give greater or less length of traverse and corresponding length of action in forming the lap or bevel on the belting. The cylinder and traverse devices being geared together, uniform adjustment of both are effected at the same time and by the same operation.

For convenience of adjustment a series of marks may be engraved on the surface of the cylinder D corresponding to the different lengths of lap or bevel used, and reading from the cut-off knife back. The cylinder can then be properly set for any given length of lap by turning the hand-wheel E' until the proper mark on the cylinder coincides with the edge line of the splitting-blade C.

The pins G² are connected by suitable links and arms to a rock-shaft, G³, at the lower part of the machine, and said shaft is provided with a treadle, G⁴, so that the locking and unlocking of the boxes H² can be effected by the operator with his foot while managing the hand-wheel E' with his hand, the various adjustments being thus quickly and conveniently made. When the adjustment has been completed the pins G² are dropped and the boxes H² are automatically relocked to the slides F' by the latches H⁵.

The distance over which the wheels D' traverse on the bars F, or from the center of cam-shaft H' to center of fulcrum $e$, governs the length of bevel or lap formed on the leather by the splitting mechanism, said distance bearing the same proportion to the length of lap as the size of the traverse-wheels bear to the size of the cylinder.

The depression or adjustment of the swinging traverse-bars F by the eccentrics or cams H adapts the mechanism to different thicknesses of leather, so that a given length can be beveled on any thickness of stock and the splitting-cut made with a true bevel for the full length of the distance from the starting to the cut-off point, whether the stock is thick, thin, or irregular in thickness, and whether a long or short lap is formed. This is a very important feature of my invention.

The cams H may be arranged in different position and be differently connected with the bars F and slide-pieces F', for varying the relative inclination thereof, without departure from the nature of my invention.

Figures 5, 7, 8, 9:
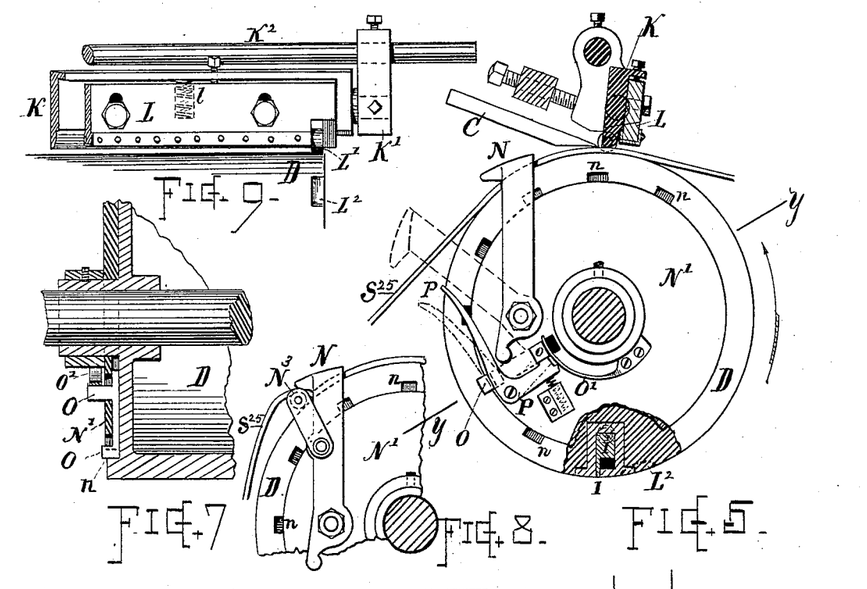
Fig. 5 is a view on a somewhat larger scale, showing the end of the revolving guiding-bed or cylinder and holding clamp mechanism, with a sectional view of the presser-bar and cut-off devices.
Fig. 7 is a section of the cylinder end at line *y y*, Fig. 5, showing the end-plate-locking bolt.
Fig. 8 is an end view, showing a modification of the clamp devices.
Fig. 9 is a rear view of a portion of the presser-bar, showing detail of construction.
Figure 6:
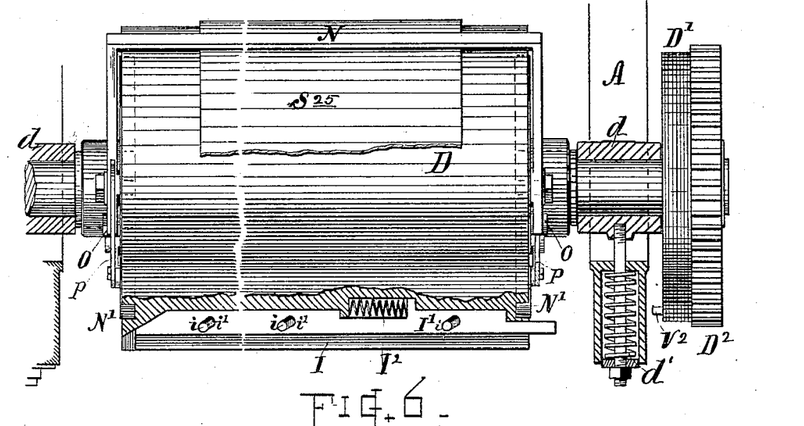
Fig. 6 is a front view of the cylinder and clamp devices, with portions in section to show detail of the cut-off knife and depressing-spring.

Another part of my invention relates to the manner of the squaring-off the feather-edge of the leather my means of an automatically-acting cutting-blade set into one-side of the cylinder. In the present instance this blade is formed and arranged as illustrated in Figs. 5 and 6, the blade I being attached to a bar, I', which is let into a suitable recess formed in the side of the cylinder parallel with its axis, with the end of the bar projecting in such a position as to engage the operating-cam J. The bar is retained by pins $i$, which work through inclined slots formed through said bar, as indicated at $i'$, the parts being arranged in such manner that when the bar I' is moved toward the left the edge of the cutting-blade will be forced outward beyond the surface of the cylinder. A spring, I², is arranged in connection with the bar for pressing it toward the right, and thus retaining the parts with the cutting-edge of the knife within the circumference of the cylinder, except when the force of said spring is overcome by the action of the operating-cam J.

The leather is held to the cylinder to be acted upon by the cutting-blades by a presser-bar mechanism, which bears upon the surface of the leather directly in front of the cutting-edge of the splitting-blade C, holding the leather firmly down upon the surface of the cylinder. Said presser-bar K is mounted between the brackets K', fixed to a transverse shaft, K², parallel with and above the cylinder, and supported by bearing-boxes K³, which are fitted to work up and down in the jaws of the frame A directly over the boxes $d$, which support the cylinder-journals, stop-bars or equivalent devices being arranged within the jaws to prevent the boxes K³ from dropping below a given position. Adjusting-screws are arranged in front of the brackets, for regulating the position of the presser-bar K, as indicated by dotted lines, Fig. 10. The form of the presser-bar is such as to permit the leather to pass freely beneath it while it imparts pressure thereto directly at the cutting-line of the knife C, so as to hold the leather firmly down from the cylinder, and thus preserve the thin portion of the laps from being cut through by reason of the curling up of the leather from the surface of the cylinder.

Upon the back of the presser-bar K is arranged an auxiliary presser-bar, L, acting in connection with the cut-off knife I. Said auxiliary presser-bar L is, in the present instance, connected to the rear side of the bar K by means of bolts or screws, which pass through vertical slots, to permit of the bar L being moved up and down on the bar K.

The bar K is provided with a flange at its upper edge, which projects over the bar L, and springs $l$ are arranged between said flange and bar in suitable recesses, for pressing said bar L downward toward the cylinder.

At the ends of the bar L small rolls L' are provided, which run upon the surface of the cylinder and hold said bar with its edge elevated clear from the surface of the leather, except at such time as the cut-off mechanism is brought into action, which is done when the cutting-knife I arrives beneath said bar L, at which time the rolls L' are permitted to drop into depressions $L^2$, (see Figs. 9 and 5,) letting the bar L descend upon the surface of the leather, while the cutting-blade I is at the same time forced outward by its bar striking the cam J, the leather being thus held to the cylinder while the cut-off knife makes a draw-cut on its surface in a direction parallel to the length of the cylinder or transversely to the bevel of the lap, so that as the leather passes to the splitting-blade C said blade will cut across the kerf made by the cutter I, thus forming a square even edge along the thin portion of the lap.

The lower edge of the bar L may be covered with rawhide or similar material, as indicated in Figs. 5 and 9, to protect the edge of the cutting-knife from any liability to accident by striking the metal.

Figure 3:
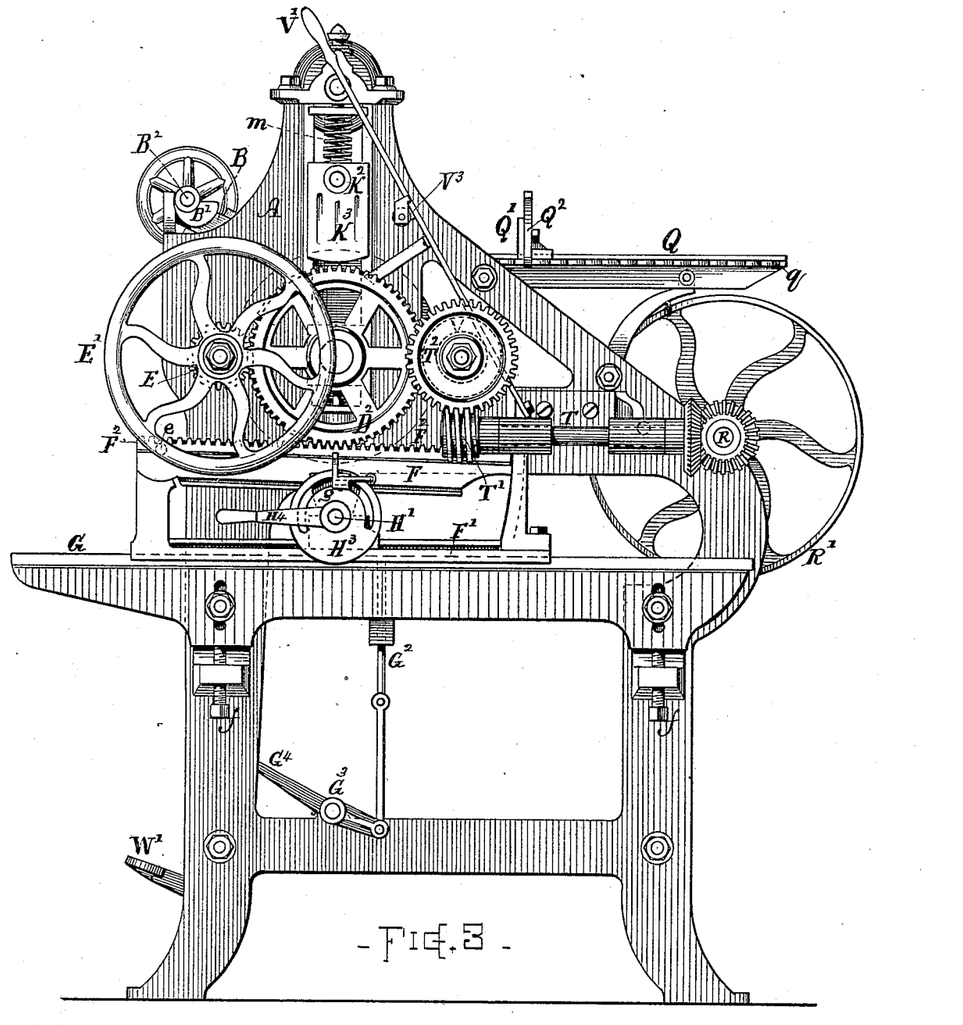
Fig. 3 is a side view, showing the right-hand end of the machine.

The presser-bars are made yielding by the introduction of springs $m$ above the boxes $K^3$, as shown in Figs. 3 and 4, the tension of which springs is adjustable by means of cams M upon the shaft M' arranged across the upper part of the machine, operating by the hand-wheel $M^2$.

Another part of my invention relates to the manner of clamping the belting or leather to the cylinder and the manner of adjusting the clamping device to different positions.

The cut-off knife I represents the terminal point in the action of the cylinder D, and coincides with the point $e$ on the traverse-bars F, the finished end of the lap being reached when said knife I is at the top of the cylinder, the point $e$ at that time being beneath the traverse-rolls, as before explained. Hence, for various lengths of lap corresponding portions of the circumference of the cylinder back from the cut-off knife I must be used, the lap being commenced at such distance back from the cut-off knife as the number of inches of lap required.

Figure 1:
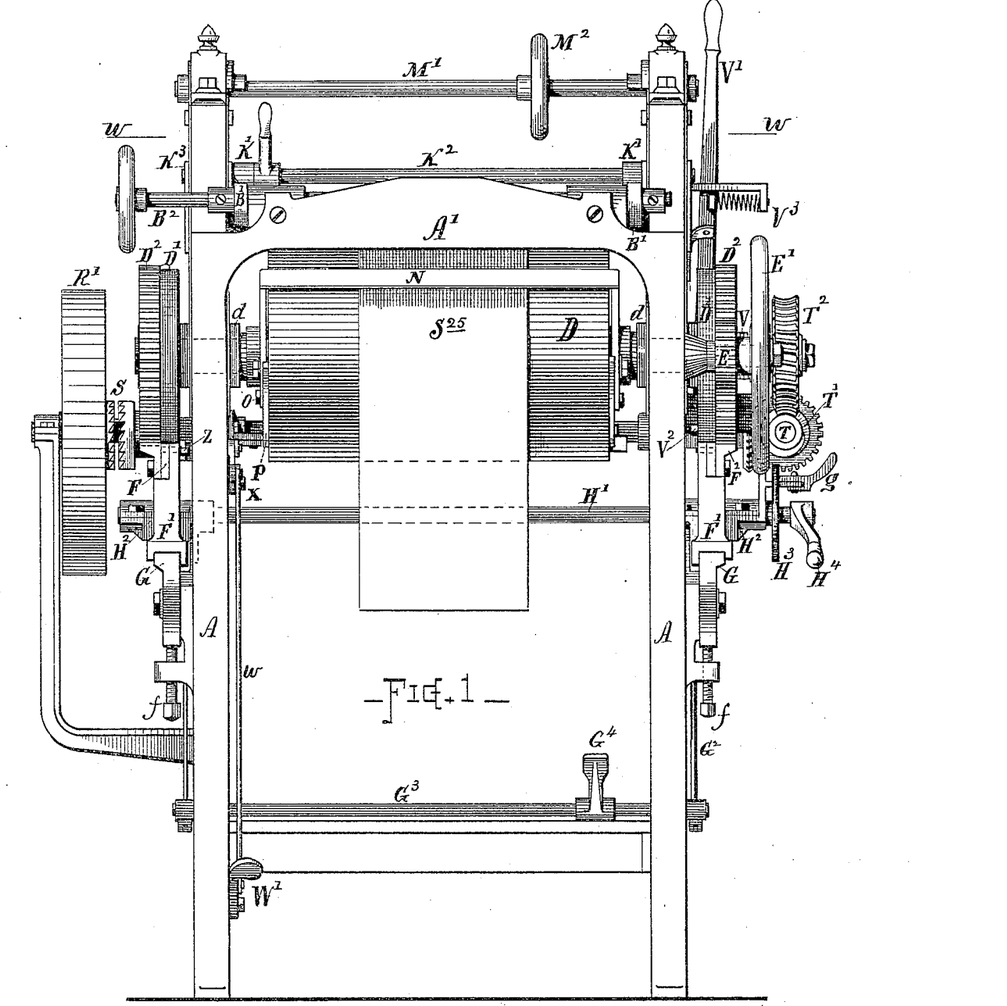
Figure 1 represents a front view of my improved machine for splitting laps.

N indicates a jaw or clamp-bar for holding the work on the cylinder. Said jaw is made as illustrated in Figs. 1, 5, and 6. This jaw consists of a bar arranged parallel to the surface of the cylinder, with its ends extending downward at the ends of the cylinder and pivoted to annular plates N' let into recesses formed in the ends of the cylinder and revoluble about the cylinder-shaft. A radial bolt, O, is arranged in each of said plates, (see Figs. 5 and 7,) which bolts engage with recesses $n$ in the end rim of the cylinder, a spring, O', being provided for pressing the bolt outward into one of the recesses. The lower ends of the jaw or bar N are extended in such a manner that they will engage the bolts O and throw them back from out the recesses $n$ when the clamp-bar N is swung back, as indicated in dotted lines, Fig. 5, thus releasing the plates N', so that the clamp can be adjusted at different positions about the cylinder.

Spring-latches P are provided, which drop in front of the bolt-heads, when they are thrown back by the jaw and prevent said bolts from catching into the recesses $n$ until such time as the jaw mechanism is properly adjusted, at which time, by raising said latches P, the bolts are permitted to drop into the proper recesses and lock the mechanism in position. These latches may not be required on small-sized machines, but are desirable in cases where the weight of the devices and the power of the springs are such that they cannot be conveniently handled with ease and facility.

If desired, the jaw or bar may be provided with a back-locking bar, $N^3$, as indicated in Fig. 8; but I prefer the construction shown in Fig. 5. The action of the jaw or bar is such that the strain on the leather causes it to hug against the surface of the cylinder with greater force as the strain is increased.

In machines for splitting bevels of only one length, the jaw N could be pivoted directly to the end of the cylinder, the annular plates N' and adjustment devices being omitted.

In rear of the cylinder, at or nearly in line with its upper surface, is arranged a table, Q, upon which the end of the belting is supported and which table is provided with an adjustable bar, Q', against which the end of the belting is placed as a guide to its proper position when placed in the machine. The bar Q' is provided with spring-latches $Q^2$, (see Fig. 11,) pivoted on each of its ends, which latches lock into ratchets or equivalent engaging parts $q$ on the edges of the table, (see Fig. 2 and dotted lines Fig. 3,) for retaining the bar at any position. Suitable handles are formed on the latches $Q^2$ that project above the bar Q' in convenient position for being thrown back by the hand when taking hold of the bar Q' to adjust it backward or forward along the table, as required. The bar Q' is to be adjusted at a distance from the splitting-knife corresponding with the length of the lap to be made, and serves as a guide for the proper adjustment of the leather.

Another part of my invention relates to the devices for operating the mechanism by power; and the devices for stopping and starting the machine automatically, and by hand. These consist of a driving shaft, R, arranged across the back of the machine and provided with a driving-pulley, R', which runs loose on said shaft, and is connected thereto for operation by a clutch, S. Shaft R connects by bevel-gears with the end shaft, T, which latter is provided with a worm, T', that meshes with the worm-wheel $T^2$, which runs upon a stud fixed in the end of the machine, in connection with a pinion, U, which latter meshes with one of the traverse gears D². The pinion U and the worm-gear T² both run loose upon the stud, and are arranged to be connected and disconnected with each other by a clutch device, V, operated by the hand-lever V', as indicated. The action from the driving-belt on the pulley R' when the clutches are in gear, moves the cylinder in the direction indicated by the arrows, Figs. 5 and 10.

Figure 2:
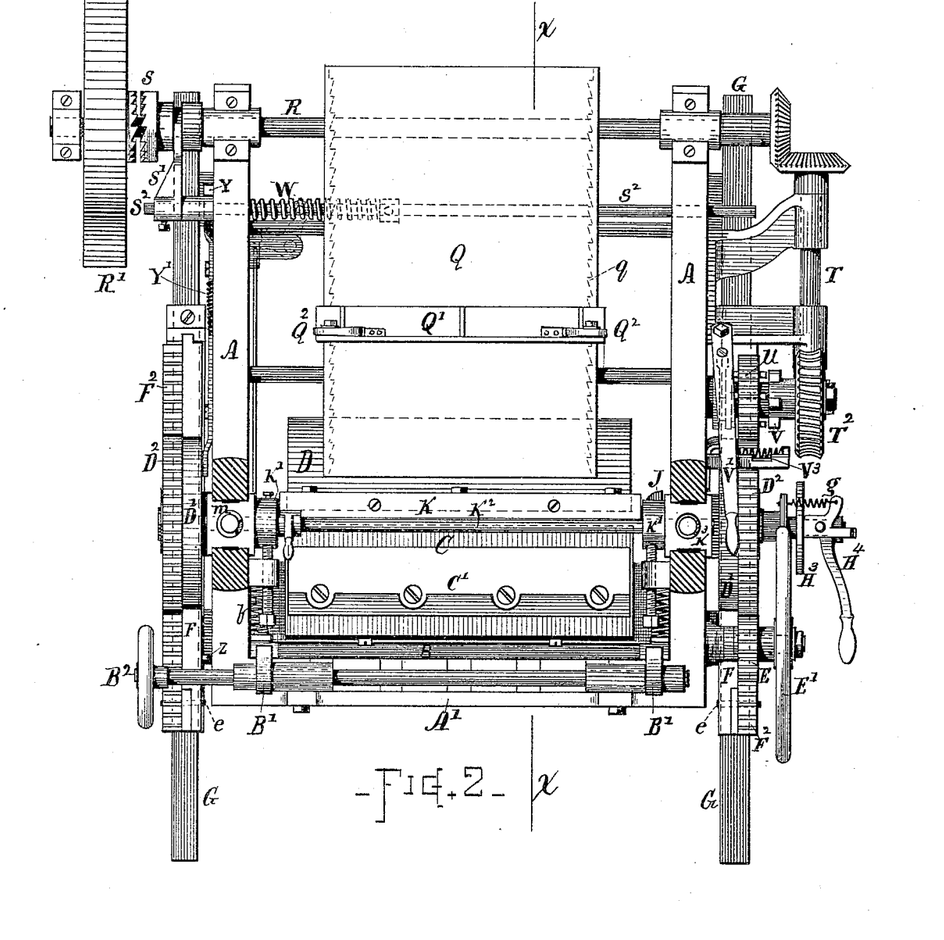
Fig. 2 is a plan view of the same, the top portion being shown in section at line *w w*, Fig. 1.

The clutch S is thrown into and out of mesh by a fork, S', attached to the reciprocating rod S². Said rod is provided with a recoil-spring, W, strained between the side of the frame and a collar keyed to the rod, as indicated in Fig. 2.

Figure 12:
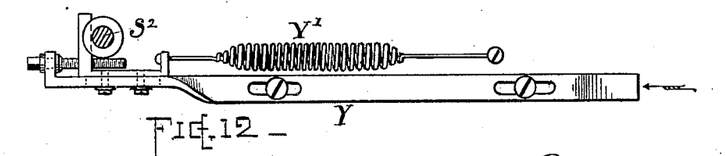
Fig. 12 is a side view of the trip-bar to the driving-clutch shipper.

A treadle, W', for actuating the shipper devices S² S' S, is connected to the rod by suitable links, w, and angle-levers X, as shown in Fig. 4, by means of which the clutch is thrown forward to engage with the operating-pulley for starting the machine. When the clutch is thrown forward, the trip-bar Y, which is arranged on the end of the machine, is drawn by its spring Y' so that its head falls between the frame A and the end of a collar on the rod S², (see Figs. 2 and 12,) thus retaining the clutch in mesh until said trip-bar Y is pressed back by the action of a pin or lug, Z, on one of the traverse bars F, which pin, striking on the front end of said trip-bar as the cut-off point e approaches the central line of the cylinder, presses said bar backward, freeing its end from beneath the collar of the rod S², permitting the spring W to throw the clutch out of mesh and stop further motion of the machine at the instant the splitting of the lap is completed.

Operation: The machine being adjusted for the proper length of lap, the operator first lets back the knife C by turning back the cams B', and then drops the cylinder by turning down the cams H, (see dotted and broken line, Fig. 10.) He then passes the end of the leather or belting S²⁵ up under the jaw N, and inserts it through the throat or space between the knife and the cylinder, (the presser-bar K being raised for the purpose,) the end being extended on to the table against the gage-bar Q', which indicates its proper position. The knife C is then forced into working position by turning down the cams B'. The cams H are also turned up, raising the cylinder until the pressure of the leather can be felt against the edge of the knife. The operator then presses his toe upon the treadle W', which throws in the clutch of the driving-pulley, and puts the cylinder into operation by throwing in the clutch V by the hand-lever V'. The revolving of cylinder D carries the leather forward against the knife C, it being held to the surface thereof by the jaw N. At the same time the traverse-bars F, running beneath the wheels D', raise the cylinder bodily toward the knife while the leather is moving forward, thus reducing the space between the cylinder and knife, thereby effecting the tapering of the leather, as required. When the cutter I reaches the presser-bar L it is brought into action, in the manner hereinbefore described for squaring off the thin end of the lap, and the machine is stopped by the pin Z forcing back of the trip-lever Y and throwing out the clutch S, the lap being completed. The position of the cylinder at the completion of the operation is indicated by dotted lines in Fig. 10, the points e of the traverse-bars F being at that time directly under the center of the traverse-wheels D'.

In lieu of setting the knife C in an inclined position it may be set level, if desired, in which case the bevel of the knife will be uppermost, and said knife may also be fixed stationary on the frame instead of upon the sliding knife-bed B; but I prefer the construction shown.

In lieu of arranging the cut-off knife I within the cylinder D, said knife may be arranged independent from the cylinder, or said cut-off knife may be dispensed with in some machines, in which latter case the presser-bar would be made single, as indicated in Fig. 10, instead of with the auxiliary bar L attached thereto, as shown in Fig. 5.

In very large, heavy machines the jaw N may be made independent from the cylinder D, if desired. Such independent jaw and independent cut-off knife, however, I propose to make the subject of further Letters Patent.

The size of the cylinder may also be varied to suit the requirements of machines for operation on different classes of work, and the relative proportion of the traverse-wheels and cylinder may be varied as required, without departure from the spirit and nature of my invention.

I am aware that a bar has heretofore been used for pressing the leather in front of a cutting-blade in leather-splitting machines; but such bars are somewhat different in construction from the one herein shown, the present bar, as will be observed, being hung adjustable in the brackets K', and the brackets arranged to swing on the shaft K² in such a manner that the bar, when swung down, will take its bearing upon the leather directly in front of the edge of the cutter, so that there will be no drag action or pulling of the leather before the bar is brought to proper working position, as is the case with a bar swinging from the top in the ordinary manner.

The clutch V may be thrown out of connection to release the pinion U from the worm-wheel T at the completion of the operation, and at the same time that the driver-clutch S is tripped by means of the pin or lug V² on the traverse-wheel D' striking an arm connected with the hand-lever V' and raising said lever from its latch-bar, thus permitting the recoil-spring V³ to act for moving back said lever V' and releasing the clutch V.

The bed-cylinder D and traverse-bars F are run back to starting position after the operation by reverse action of the hand-wheel E'.

What I claim as of my invention, and desire to secure by Letters Patent, is—

1. In a machine for splitting tapers or laps on leather, the combination of a splitting-blade, a cylinder-supporting bed for carrying the leather to said blade, a yielding presser-bar, and a mechanism for automatically raising or advancing said cylinder bodily toward the splitting-blade with a regular or defined movement during the time of its forward revolution or while making the splitting-cut, substantially as hereinbefore set forth.

2. In a machine for splitting tapers or laps on leather or belting, the combination, with the stationary supported splitting-blade and yielding presser devices, of the revoluble bed-cylinder mounted in movable journal-boxes and provided with traverse or supporting wheels, and the reciprocating traverse-bars or inclines arranged beneath said wheels for supporting and elevating said cylinder during its forward revolutory movement, substantially as and for the purpose set forth.

3. In a machine for forming laps on belting, the combination, with a splitting-blade and presser devices, of a bed cylinder or roll mounted in movable bearings, and provided at its ends with supporting-wheels and gears which stand upon vibrating traverse-bars and racks running beneath said wheels for the support and government of the cylinder, said traverse-bars being provided with a duplex adjusting mechanism, substantially as described, adapted for varying the adjustment of said bars to correspond with different lengths of lap or bevel, and also for further varying the adjustment or position of the bars to correspond with different thicknesses of stock, as hereinbefore set forth.

4. The combination, with the splitting-blade, the yielding presser device, and bed-cylinder provided with traverse-wheels, of the adjustable traverse-bars supporting said cylinder, the reciprocating slides carrying said traverse-bars, and guideway rails or parallels for supporting and directing said slides, substantially as hereinbefore set forth.

5. The combination, with traverse-wheels or surfaces which support the cylinder and the traverse-bars or inclines for sustaining the same, of the toothed gears and racks arranged in connection and relation therewith, substantially as and for the purpose set forth.

6. The combination, with the adjustable inclines or traverse-bars pivoted or fulcrumed at their forward ends to the reciprocating slides, as described, of the eccentrics, cams, or equivalent devices for elevating and depressing the rear portion of said traverse-bars, substantially as set forth.

7. The combination, with the adjustable inclines or traverse-bars, pivoted or fulcrumed to the reciprocating slides, as described, of a cam-shaft provided with eccentrics, cams, or equivalent devices for raising and depressing said bars, and mounted in bearings which are adjustable longitudinally upon said slides, substantially as and for the purpose hereinbefore set forth.

8. The combination, with the cam-shaft bearings $H^2$, adjustably arranged upon the slide-bars $F'$, of automatic latch-levers $H^5$, pivoted to said bearings and locking into depressions formed in said slide-bars for retaining said cam-shaft at adjusted positions on said slide-bars, substantially as set forth.

9. The combination, with the guide way-rails, traverse-bars, slides, and cam-shaft bearings adjustably connected therewith, of mechanism for temporarily locking said bearings to the guideway-rails and retaining said cam-shaft devices at a fixed position while effecting adjustment of the traverse mechanism, substantially as hereinbefore set forth.

10. The combination, with the guideway-rails G, traverse-bar slides $F'$, cam-shaft bearings $H^2$, and latch-levers $H^5$, of the stops $G'$, locking-pins $G^2$, rocker-shaft $G^3$, and treadle $G^4$, substantially as and for the purposes set forth.

11. The combination, with the cam-shaft $H'$ and cams H, of the slotted disk $H^3$ and clamp-dog $g$, substantially as and for the purpose set forth.

12. The combination, with the stationary supported splitting-knife, movable bed-cylinder, traverse devices, and supporting-slides, of the guideways or parallel rails, adjustably connected to the standard-frames, and the leveling-screws arranged in connection therewith, substantially as and for the purposes set forth.

13. The combination, with the splitting-blade, of the sliding knife-bed, the cams for setting forward said knife-bed, and the shaft for operating said cams, substantially as described.

14. The reciprocating knife-bed B, provided with wedging-ends, in combination with the the supporting-frame provided with guiding-grooves or openings having contracted portions for embracing said wedging-ends and retaining the knife and bed firm and solid when set forward to working position, substantially as set forth.

15. The combination, with the splitting-blade C and sliding knife-bed B, of the re-enforce bar $C'$, constructed and arranged as shown, and for the purpose set forth.

16. In a machine for forming laps on leather belting, the combination, with a splitting-blade, a yielding presser, and a revolving-cylinder bed, of a clamp or jaw mechanism adapted for holding the leather and drawing it forward with a movement to correspond with the forward action of the bed-cylinder surface, substantially as hereinbefore set forth.

17. The combination, with the bed-cylinder and splitting-blade, of a clamp-piece or jaw-bar pivoted to the ends of said cylinder and operating against the face thereof for retaining the leather and drawing it onto the blade, substantially as set forth.

18. The combination, with the bed-cylinder and splitting-blade, of an adjustably-connected clamp-piece or jaw-bar operating with the surface of said cylinder and adapted to be set for use at different positions about the circumference thereof, substantially as set forth.

19. The combination, substantially as hereinbefore described, of the bed-cylinder having recessed ends, the revoluble end plates with radial locking-bolts arranged therein, the clamp or jaw bar having extended ends pivoted to said end plates in such position that said extended ends engage and press back said locking-bolts for releasing the revoluble end plates when said jaw-bar is swung outward to the full extent of its action, as set forth.

20. The combination, with the locking-bolts O and their springs O′, of the latch-levers P, substantially as and for the purpose set forth.

21. In a machine for making laps or tapers on belting, the combination, with the splitting-blade, yielding presser, and bed-cylinder, of an auxiliary cutter or blade adapted for making a cut or kerf transversely across the belting at the end of the lap or taper, substantially as and for the purpose set forth.

22. The combination, with the bed-cylinder D, of the cut-off blade I, its supporting-bar I′, provided with inclined slots $i'$, the pins $i$, the return-spring $I^2$, and the cam or lug J, substantially as and for the purposes set forth.

23. The presser-bar K, adjustably supported in brackets K′ on a rocker-shaft, $K^2$, mounted at its ends in yielding bearings $K^3$, as described, in combination with the splitting-blade and bed-cylinder, arranged for operation as set forth.

24. The combination, with the presser-bar K, cylinder D, and cut-off knife I, of the auxiliary presser-bar L, adjustably connected to the bar K, and arranged for operation in connection with said cut-off knife substantially as set forth.

25. The combination, with the splitting-blade, bed-cylinder, yielding presser-bar, and adjustable traverse-bar mechanism, of the table Q, provided with the adjustable gage-bar, substantially as and for the purpose set forth.

26. The combination, with the table Q and gage-bar Q′, of the ratchets or depressions $q$ and the latches $Q^2$, arranged for operation in connection therewith, substantially as shown and described.

27. The pinion E and hand-wheel E′, in combination with the cylinder, traverse-gears, and traverse-bar devices, substantially as shown, and for the purpose set forth.

28. The combination, with the cylinder, traverse-gear $D^2$, and traverse-bar devices, of the shaft T, provided with a worm, T′, a worm-wheel, $T^2$, meshing therewith, a pinion, U, meshing with said traverse-gear, a clutch, V, connecting said worm-wheel and pinion, and a hand-lever, V′, for operating said clutch, substantially as and for the purposes set forth.

29. The combination, with the clutch S, connecting the driving-pulley and operating-shaft, and shipper-bar $S^2$, provided with spring W and fork S′, of the treadle W′, links $w$, and angle-levers X, arranged as shown and described.

30. The combination, with the shipper-bar $S^2$, which operates the driver-clutch S, and the traverse devices which work in connection with the bed-cylinder, of the trip-bar Y, spring Y′, and actuating-lug Z, arranged and operating substantially as set forth.

31. The combination, with the clutch V and lever V′, of the recoil-spring $V^3$ and tripping-lug $v^2$, on the traverse-wheel D′, substantially as and for the purpose set forth.

Witness my hand this 15th day of April, A. D. 1881.

AARON F. STOWE.

Witnesses:
 CHAS. H. BURLEIGH,
 GEO. M. RICE.